United States Patent
Wang et al.

(10) Patent No.: US 10,824,030 B2
(45) Date of Patent: Nov. 3, 2020

(54) GRAYSCALE CONTROL STRUCTURE AND METHOD, LIQUID CRYSTAL DISPLAY PANEL AND DISPLAY DEVICE

(71) Applicant: BOE TECHNOLOGY GROUP CO., LTD., Beijing (CN)

(72) Inventors: Haiyan Wang, Beijing (CN); Wenqing Zhao, Beijing (CN); Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/118,323

(22) Filed: Aug. 30, 2018

(65) Prior Publication Data
US 2019/0101797 A1  Apr. 4, 2019

(30) Foreign Application Priority Data

Sep. 29, 2017 (CN) .......................... 2017 10 911718

(51) Int. Cl.
*G02F 1/1343* (2006.01)
*G02F 1/133* (2006.01)
(Continued)

(52) U.S. Cl.
CPC .... *G02F 1/134309* (2013.01); *G02F 1/13306* (2013.01); *G02F 1/133504* (2013.01);
(Continued)

(58) Field of Classification Search
CPC ......... G02F 1/133553; G02F 1/133555; G02F 2001/133618; G02F 1/133512;
(Continued)

(56) References Cited

U.S. PATENT DOCUMENTS

2013/0278847 A1* 10/2013 Hong ................ G02F 1/133526
349/15
2014/0055716 A1* 2/2014 Zhang ............... G02F 1/133512
349/64
(Continued)

FOREIGN PATENT DOCUMENTS

CN        102654665 A        9/2012
CN        106526942 A        3/2017
(Continued)

OTHER PUBLICATIONS

Chinese Office Action dated Oct. 8, 2019, from application No. 201710911718.X.

*Primary Examiner* — Michael H Caley
*Assistant Examiner* — Mariam Qureshi
(74) *Attorney, Agent, or Firm* — Foley & Lardner LLP

(57) ABSTRACT

The present disclosure relates to a grayscale control structure, including a first substrate, a light extraction layer, an electrode layer, a liquid crystal layer, a filter layer and a second substrate which are sequentially stacked. The electrode layer is provided with a plurality of strip-shaped electrodes arranged in parallel to form lens units in the liquid crystal layer. The filter layer includes light exit strips and a black matrix arranged in parallel, and the light exit strips are disposed opposite to the lens units. Light extraction gratings are disposed in the light extraction layer, the light extraction gratings are disposed opposite to the light exit strips, and a projection of individual one of the light exit strips on the light extraction layer covers a corresponding one of the light extraction gratings.

13 Claims, 3 Drawing Sheets

(51) Int. Cl.
  *G02F 1/1335*   (2006.01)
  *G02F 1/13357*  (2006.01)
  *G02F 1/29*     (2006.01)

(52) U.S. Cl.
  CPC .. *G02F 1/133512* (2013.01); *G02F 1/133617* (2013.01); *G02F 1/29* (2013.01); *G02F 2001/291* (2013.01); *G02F 2001/294* (2013.01); *G02F 2203/30* (2013.01)

(58) Field of Classification Search
  CPC ..... G02F 2001/134345; G02F 2203/30; G02F 1/133526; G02F 1/133753; G02F 1/1343; G02F 1/136209; G02F 2001/1351; G02F 2201/30; G02F 2201/302; G02F 2201/305; G02F 2201/307; G09G 3/2007; G02B 27/0955; H01L 51/5275
  See application file for complete search history.

(56) References Cited

U.S. PATENT DOCUMENTS

2017/0293151 A1\* 10/2017 Zha ................... G02B 27/2214
2018/0314107 A1\* 11/2018 Park .................. G02F 1/133514

FOREIGN PATENT DOCUMENTS

| CN | 106773379 A | 5/2017 |
|----|-------------|--------|
| KR | 20140060835 A | 5/2014 |

\* cited by examiner (a) (b)

GRAYSCALE CONTROL STRUCTURE AND METHOD, LIQUID CRYSTAL DISPLAY PANEL AND DISPLAY DEVICE

CROSS-REFERENCE TO RELATED APPLICATIONS

This application claims priority to Chinese Patent Application 201710911718.X, filed Sep. 29, 2017, the entire contents of which are incorporated herein by reference.

TECHNICAL FIELD

The present disclosure relates to display technologies and particularly to a grayscale control structure, a grayscale control method, a liquid crystal display panel and a display device.

BACKGROUND

As compared with traditional CRT displays, liquid crystal displays have the advantages of zero radiation, low energy consumption, and low heat dissipation and the like. In terms of image display function, the liquid crystal displays can accurately restore the images without any geometric distortion and linear distortion, the liquid crystal displays also have the characteristic of displaying sharp characters, and the displayed images are stable without flickering. Because of these advantages, liquid crystal displays have been widely used.

As shown in FIG. 1, the display panel of a conventional liquid crystal display includes a color filter layer and two polarizing layers. This structural has low light transmittance and low light efficiency, thus resulting in high energy consumption of the liquid crystal display and low energy utilization.

SUMMARY

An objective of the present disclosure is to provide a grayscale control structure which can increase light transmittance, increase energy utilization, reduce energy consumption and has a high contrast ratio.

Another objective of the present disclosure is to provide a liquid crystal display panel and a display device which both use the grayscale control structure and thus have high light transmittance and good display effects.

Another objective of the present disclosure is to provide a grayscale control method which is implemented using the grayscale control structure and can increase light transmittance.

In order the realize the above objectives, the present disclosure provides the following technical solutions.

An arrangement of the present disclosure provides a grayscale control structure, including a first substrate, a light extraction layer, an electrode layer, a liquid crystal layer, a filter layer and a second substrate which are sequentially stacked.

The electrode layer is provided with a plurality of strip-shaped electrodes arranged in parallel to form lens units in the liquid crystal layer.

The filter layer includes light exit strips and a black matrix arranged in parallel, and the light exit strips are disposed opposite to the lens units.

Light extraction gratings are disposed in the light extraction layer. The light extraction gratings are disposed opposite to the light exit strips. A projection of individual one of the light exit strips on the light extraction layer covers a corresponding one of the light extraction gratings.

According to an exemplary arrangement, each of the light extraction gratings has a light exit angle of 0 to 3 degrees or 9 to 19 degrees.

According to an exemplary arrangement, each of the light extraction gratings has a width of 3~9 μm, and a horizontal distance between each of the light extraction gratings and the black matrix is 0.4~1.9 μm.

According to an exemplary arrangement, each of the light exit strips includes a quantum dot capable of adjusting the color of exit light (i.e., the light exit from the light exit strips).

According to an exemplary arrangement, the grayscale control structure further includes a flat layer disposed between the liquid crystal layer and the filter layer.

An arrangement of the present disclosure provides a liquid crystal panel including the grayscale control structure as described.

An arrangement of the present disclosure provides a display device, including the grayscale control structure as described.

An arrangement of the present disclosure provides a grayscale control method. The method is applied in the grayscale control structure as described. The method includes according to a display requirement, adjusting voltage applied onto each of the strip-shaped electrodes to change the shape of each of the lens units, so that light refracted by each of the lens units passes through the light exit strips or shielded by the black matrix.

According to an exemplary arrangement, voltages applied onto strip-shaped electrodes corresponding to one of the lens units are increased sequentially to ensure that light reaching the filter layer can passes through a corresponding light exit strip.

According to an exemplary arrangement, voltages applied onto strip-shaped electrodes corresponding to one of the lens units are decreased sequentially to ensure that light reaching the filter layer can be shielded by the black matrix.

The additional aspects and advantages of the present disclosure will be set forth in part in the description which follows.

BRIEF DESCRIPTION OF THE DRAWINGS

The above and/or additional aspects and advantages of the present disclosure will become apparent and readily understood from the following descriptions with reference to drawings, in which:

in FIG. 3, a is a prismatic lens formed when sequentially increased positive voltages are applied on strip-shaped electrodes, and b is a convex lens formed when positive voltages applied to the strip-shaped electrodes at both sides are greater than positive voltages applied to the strip-shaped electrodes in the middle.

in FIG. 6, c is a prismatic lens formed when sequentially increased positive voltages are applied on strip-shaped electrodes, and d is a convex lens formed when positive voltages applied to the strip-shaped electrodes at both sides are greater than positive voltages applied to the strip-shaped electrodes in the middle;

DETAILED DESCRIPTION

Figure 1:
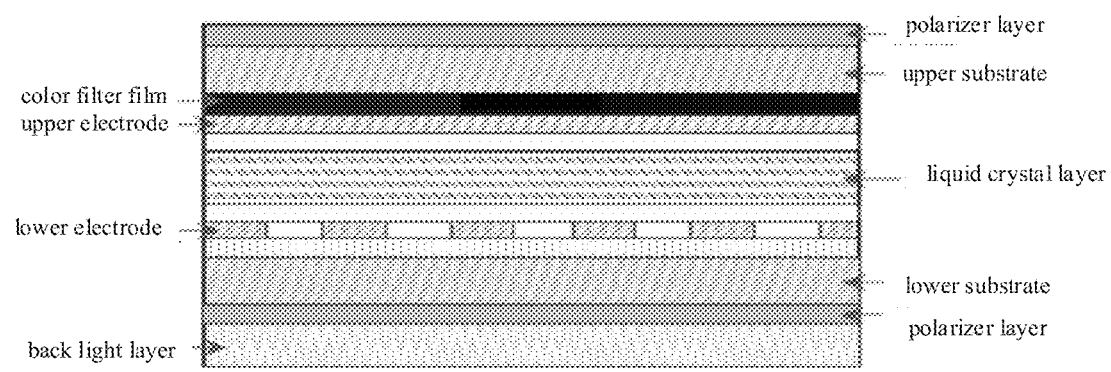
FIG. 1 is a schematic structural view of a display panel of a liquid crystal display in related art.

Arrangements of the present disclosure are described in detail below, and the examples of the arrangements are illustrated in the drawings, in which the same or similar reference numerals are used to refer to the same or similar elements or elements having the same or similar functions. The arrangements described below with reference to the accompanying drawings are illustrative and are intended to explain the present disclosure, but are not intended to be construed as limiting the present disclosure.

Figure 2:
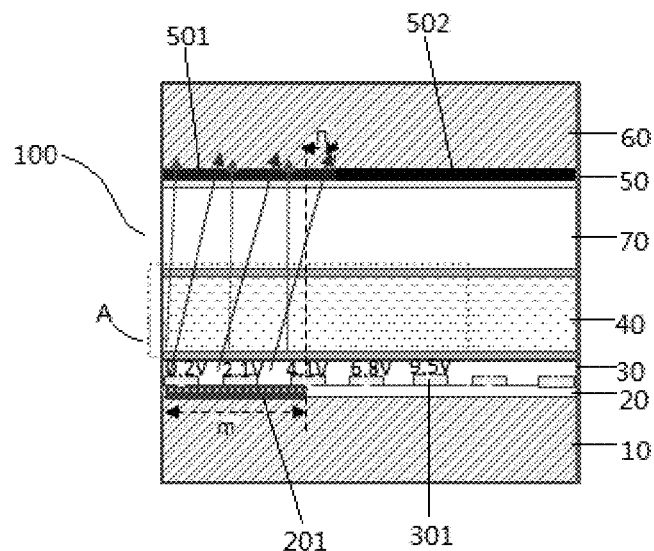
FIG. 2 is a schematic diagram of an exemplary arrangement of a grayscale control structure according to an arrangement of the present disclosure.

FIG. 2 shows a grayscale control structure according to an arrangement of the present disclosure. The grayscale control structure 100 includes a first substrate 10, a light extraction layer 20, an electrode layer 30, a liquid crystal layer 40, a filter layer 50, and a second substrate 60 which are sequentially stacked. The pre-tilt angles of the first substrate 10 and the second substrate 60 are both 2° to shorten the reaction time of the liquid crystal under voltage driving. An insulating layer (not shown) may be disposed between the electrode layer 30 and the liquid crystal layer 40. For example, the insulating layer is made of a PI material (polyimide), and thus has good insulating properties.

Specifically, a plurality of strip-shaped electrodes (or slit electrodes) 301 are disposed in parallel in the electrode layer 30, and lens units are formed in the liquid crystal layer 40 by applying a voltage on each of the strip-shaped electrodes 301. The filter layer 50 includes light strip 501s and a black matrix 502 arranged in parallel. The light exit strips 501 can transmit light (enable light to pass through), and the black matrix 502 can block light (or shield light). Light extraction gratings 201 are disposed in the light extraction layer 20, and the light extraction gratings 201 are disposed opposite to the light exit strips 501, and a projection of individual one of the light exit strips 501 on the light extraction layer 20 covers a corresponding one of the light extraction gratings 201. By applying voltages on the strip-shaped electrodes 301, the lens units formed in the liquid crystal layer are disposed between the light extraction gratings 201 and the light exit strips 501.

In the above design, light is incident from the light extraction gratings 201 and enters the liquid crystal layer 40, and is then refracted by the lens units, so that the light propagation direction and the polarization state are changed, and the light reaching the filter layer 50 can pass through the light exit strips 501, or can be blocked by the black matrix 502. By adjusting the magnitudes of the voltages applied to the strip-shaped electrodes 301, the shapes of the lens units can be changed, thus changing the refractive direction and polarization state of the light and accordingly changing the grayscale. Therefore, the grayscale control structure 100 can increase the light transmittance by adjusting the direction of the incident light, thus having a large light efficiency and a good contrast ratio.

Figure 7:
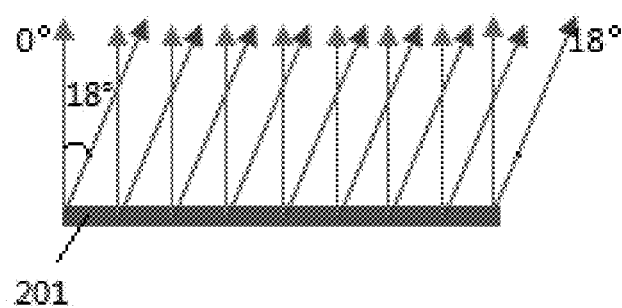
FIG. 7 is a schematic diagram showing light extraction of a light extraction grating in a grayscale control structure according to an arrangement of the present disclosure.

Referring to FIG. 7, each of the light extraction gratings 201 may have a light exit angle of 0 to 18°. Preferably, the light exit angle is selected from 0° to 3° or 9° to 19°.

According to an exemplary arrangement, the width m of each of the light extraction gratings 201 is selected from 3 μm to 9 μm, and preferably, 5 μm. The horizontal distance n between the black matrix 502 and the light extraction gratings 201 is selected from 0.4 μm to 1.9 μm, preferably, 1.1 μm.

According to an exemplary arrangement, the liquid crystal cell gap in the liquid crystal layer 40 is 10 μm, and the rubbing direction of the liquid crystal is 0° or 90°, that is, the long axis of the liquid crystal initial state is a horizontal 0° or 90° orientation.

Figure 3:
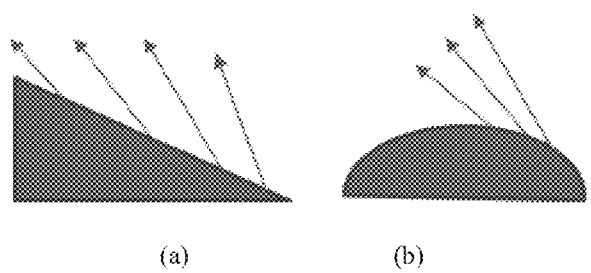
FIG. 3 is a schematic structural view of a lens unit of part A in FIG. 2, and shows light refraction paths.

Referring to FIG. 3, when the positive voltages applied to the strip-shaped electrodes 301 in the electrode layer 30 are sequentially increased, a prismatic lens as shown in "a" of FIG. 3 is formed in the liquid crystal layer 40. The incident light is refracted by the prismatic lens so that the light is deflected to the left. Accordingly, the refracted light can completely pass through a corresponding light exit strip 501, and the light transmittance can be increased (for example, the state shown in FIG. 3 can correspond to the grayscale 255).

In one arrangement, the strip-shaped electrodes 301 from left to right are sequentially applied with positive voltages of 0.2, 2.1, 4.1, 6.8, 9.5 V to form a lens unit shaped like a prismatic lens. Taking this as a premise, and taking the light extraction grating 201 having a light exit angle of 0° or 18° as an example, when the light exit angle is 0°, the incident light is not blocked, and because the projection of the light exit strip 501 on the light extraction layer 20 completely covers the light extraction grating 201, the incident light can completely pass through the light exit strip 501. When the light exit angle is 18°, the incident light is deflected to the left, and 84.6% of the light is emitted. At this time, the light efficiency is 92.3%.

Of course, the magnitudes of the voltages applied on the strip-shaped electrodes 301 are not specifically limited, and other voltage combinations may be selected as long as the positive voltages applied to the electrodes from left to right are sequentially increased to form a lens unit like the prismatic lens in "a" of FIG. 3 (that is, the voltages applied to the electrodes from left to right are in an ascending order). According to an exemplary arrangement, the maximum voltage applied should not be greater than 10V. In addition, the voltages applied to the strip-shaped electrodes 301 can also be adjusted to form a lens unit like the lens as shown in "b" of FIG. 3, and the refracted light is deflected to the left.

Figure 6:
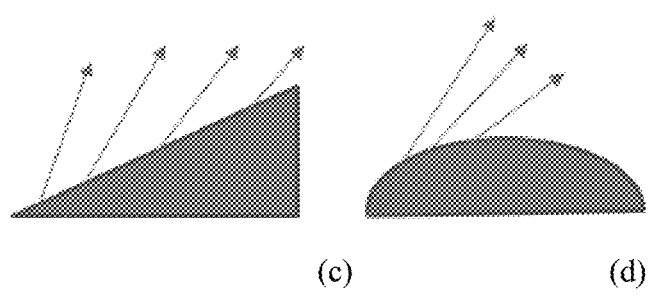
FIG. 6 is a schematic structural view of a lens unit of part B of FIG. 5, and shows a light refraction path.

Referring to FIG. 6, when the positive voltages applied on the strip-shaped electrodes 301 in the electrode layer 30 are sequentially decreased (i.e., the voltages applied on the electrodes 301 are in a descending order), a prismatic lens as shown in "c" of FIG. 6 is formed in the liquid crystal layer 40. The incident light is refracted by the prismatic lens so that the light is deflected to the right. Accordingly, the refracted light can be blocked by the black matrix 502.

In one arrangement, the strip-shaped electrodes 301 from left to right are sequentially applied with positive voltages of 9.5, 6.8, 4.1, 2.1, 0.2 V to form a lens unit shaped like a prismatic lens. Similarly, on the premise, when the light extraction grating 201 has an exit angle of 0° or 18°, the refracted light is deflected to the right and completely blocked by the black matrix 502. No light is emitted at this time, and the dark state is realized, that is, the grayscale is 0.

Of course, the magnitudes of the voltages applied on the strip-shaped electrodes 301 are not specifically limited, and other voltage combinations may be selected as long as the positive voltages applied to the electrodes from left to right are sequentially decreased to form a lens unit like the prismatic lens in "c" of FIG. 6 (that is, the voltages applied to the electrodes from left to right are in a descending order). According to an exemplary arrangement, the maximum voltage applied should not be greater than 10V. In addition, the voltages applied to the strip-shaped electrodes 301 can also be adjusted to form a lens unit like the lens as shown in "d" of FIG. 6, and the refracted light is deflected to the right.

The above two cases are extreme cases in which the former enables the refracted light to pass almost completely through the light exit strips 501 and the latter enables the refracted light to be completely blocked by the black matrix 502. In general, the shapes of the lens units can be changed by adjusting the voltage applied to each strip-shaped electrode 301 such that a portion of the light refracted by the lens unit passes through the light exit strip 501 while another portion of the light refracted by the lens unit is blocked by the black matrix 502. In this way, different grayscales can be formed to meet different display requirements.

According to an exemplary arrangement, the grayscale control structure may further include a voltage applying device (shown by reference numeral 801 in FIG. 3) for applying voltages to the strip-shaped electrodes to form the lens units. The voltage applying device can be implemented by a power supply in conjunction with (or in corporation with) different voltage dividers (such as resistors) to apply different voltages.

The voltage applying device 801 can apply incrementally increased voltages to a plurality of strip-shaped electrodes corresponding to one lens unit to enable light reaching the filter layer to pass through the light exit strip. That is to say, different lens units correspond to different plurality of strip-shaped electrodes, and for the strip-shaped electrodes corresponding to each lens unit, the applied voltages may be incrementally increased.

The voltage applying device 801 can also apply incrementally decreased voltages to a plurality of strip-shaped electrodes corresponding to one lens unit so that light reaching the filter layer can be blocked by the black matrix.

Further, each of the light exit strip 501 includes a quantum dot. When excited by external energy such as light or electricity, the quantum dot emits colored light. The color of the light is determined by the constituent material, shape and size of the quantum dot. When the size of the quantum dot varies, the quantum confinement of electrons and holes varies, and the discrete energy levels vary. Generally, the smaller the particles, the longer the waves will be absorbed. The larger the particles, the shorter the waves will be absorbed. Therefore, the quantum dot materials can be selected according to the display requirements and their sizes and shapes can be set to achieve different display effects.

Referring to FIG. 2, the grayscale control structure 100 further includes a flat layer 70 disposed between the liquid crystal layer 40 and the filter layer 50 to increase the distance between the lens units and the filter layer 50. Thus, the light travelling path is increased or lengthened, thus facilitating control of the position at which the light reaches the filter layer 50. Preferably, the flat layer 70 has a height of 15 μm. An insulating layer (not shown) may be disposed between the flat layer 70 and the liquid crystal layer 40. Preferably, the insulating layer is made of a PI material (polyimide) and thus has good insulating properties.

Figure 4:
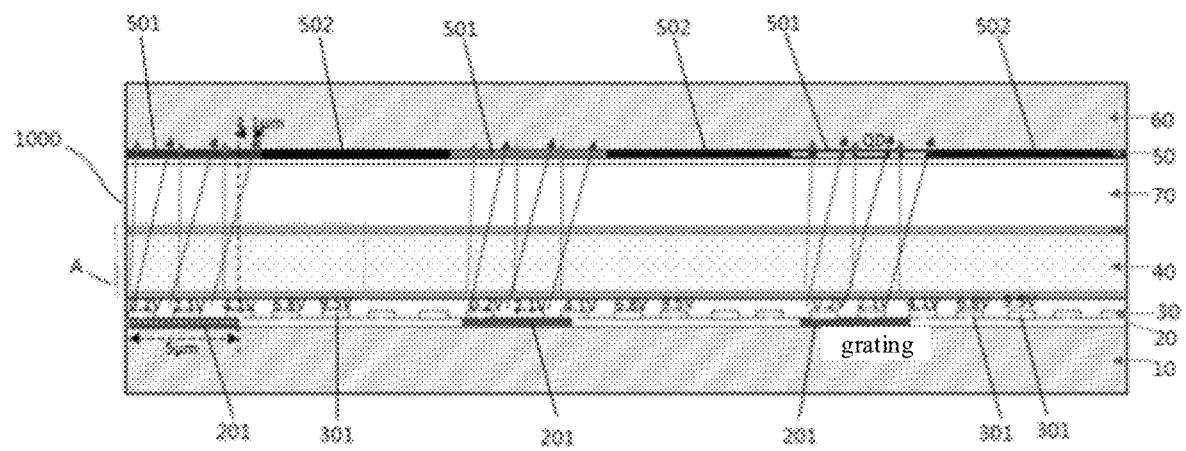
FIG. 4 is a partial schematic view of a liquid crystal display panel including the grayscale control structure of FIG. 2, showing light paths through the light strips.
Figure 5:
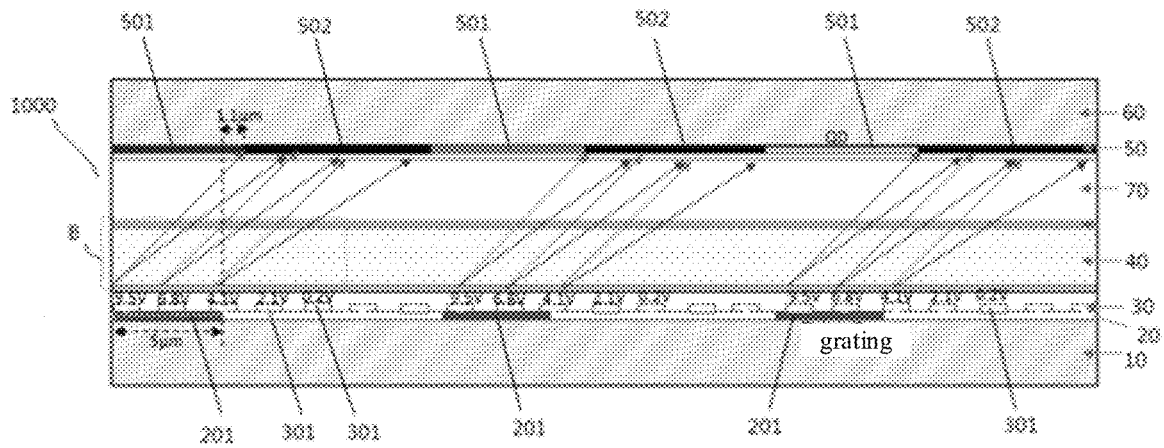
FIG. 5 is a partial schematic view of a liquid crystal display panel including the grayscale control structure of FIG. 2, showing light paths in which light is blocked by a black matrix.

Referring to FIGS. 4 and 5, an arrangement of the present disclosure further provides a liquid crystal display panel 1000 including a plurality of the grayscale control structures 10 as described above.

Referring to FIG. 4, and in conjunction with FIG. 3, when the positive voltages applied to the strip-shaped electrodes 301 in the electrode layer 30 are sequentially increased, a prismatic lens as shown in "a" of FIG. 3 is formed in the liquid crystal layer 40. The incident light is refracted by the prismatic lens so that the light is deflected to the left. Accordingly, the refracted light can completely pass through a corresponding light exit strip 501, and the light transmittance can be increased.

Referring to FIG. 5, and in conjunction with FIG. 6, when the positive voltages applied on the strip-shaped electrodes 301 in the electrode layer 30 are sequentially decreased (i.e., the voltages applied on the electrodes 301 are in a descending order), a prismatic lens as shown in "c" of FIG. 6 is formed in the liquid crystal layer 40. The incident light is refracted by the prismatic lens so that the light is deflected to the right. Accordingly, the refracted light can be blocked by the black matrix 502.

In general, the shapes of the lens units can be changed by adjusting the voltage applied to each strip-shaped electrode 301 such that a portion of the light refracted by the lens unit passes through the light exit strip 501 while another portion of the light refracted by the lens unit is blocked by the black matrix 502. In this way, different grayscales can be formed to meet different display requirements.

Accordingly, an arrangement of the present disclosure also provides a display device that utilizes the liquid crystal display panel 1000 and thus has the advantages of the liquid crystal display panel 1000. Repeated descriptions will be omitted here. The display device may be any product or component having a display function, such as an electronic paper, a mobile phone, a tablet computer, a television, a display, a notebook computer, a digital photo frame, a navigator, and the like.

In addition, an arrangement of the present disclosure further provides a grayscale control method, which is applied to the grayscale control structure 100. The method includes: according to a display requirement, adjusting voltage applied onto each of the strip-shaped electrodes 301 to change the shape of each of the lens units, so that light refracted by each of the lens units passes through the light exit strips 501 or is shielded by the black matrix 502.

Specifically, when the positive voltages applied to the strip-shaped electrodes 301 in the electrode layer 30 are sequentially increased, a prismatic lens as shown in "a" of FIG. 3 is formed in the liquid crystal layer 40. The incident light is refracted by the prismatic lens so that the light is deflected to the left. Accordingly, the refracted light can completely pass through a corresponding light exit strip 501, and the light transmittance can be increased. When the positive voltages applied on the strip-shaped electrodes 301 in the electrode layer 30 are sequentially decreased, a prismatic lens as shown in "c" of FIG. 6 is formed in the liquid crystal layer 40. The incident light is refracted by the prismatic lens so that the light is deflected to the right. Accordingly, the refracted light can be blocked by the black matrix 502.

In general, the shapes of the lens units can be changed by adjusting the voltage applied to each strip-shaped electrode 301 such that a portion of the light refracted by the lens unit passes through the light exit strip 501 while another portion of the light refracted by the lens unit is blocked by the black matrix 502. In this way, different grayscales can be formed to meet different display requirements.

The above is only a part of the arrangements of the present disclosure, and it should be noted that those skilled in the art can also make some improvements and modifications without departing from the principles of the present disclosure. Such improvements and modifications should be considered as falling within the scope of the present disclosure.

What is claimed is:

1. A grayscale control structure, comprising a first substrate, a light extraction layer, an electrode layer, a liquid crystal layer, a filter layer and a second substrate which are sequentially stacked;
   wherein:
   the electrode layer is provided with a plurality of strip-shaped electrodes arranged in parallel to form lens units in the liquid crystal layer;
   the filter layer comprises light exit strips and a black matrix arranged side-by-side, and the light exit strips are disposed opposite to the lens units;
   the light extraction layer is disposed between the first substrate and the electrode layer, light extraction gratings are disposed in the light extraction layer for enabling light incident to the light extraction gratings to go to the liquid crystal layer, each of the light extraction gratings has a light exit angle of 0 to 3 degrees or 9 to 19 degrees, the light extraction gratings are disposed opposite to the light exit strips, and a projection of individual one of the light exit strips on the light extraction layer fully covers a corresponding one of the light extraction gratings, there is no overlap between orthographic projections of the light extraction gratings on the first substrate and an orthographic projection of the black matrix on the first substrate;
   wherein the grayscale control structure further comprises a flat layer disposed above the light extraction layer.

2. The grayscale control structure according to claim 1, wherein each of the light extraction gratings has a width of 3~9 μm, and a horizontal distance between each of the light extraction gratings and the black matrix is 0.4~1.9 μm.

3. The grayscale control structure according to claim 1, wherein each of the light exit strips comprises a quantum dot capable of adjusting a color of exit light.

4. The grayscale control structure according to claim 1, further comprising:
   a voltage applying device for applying voltages to the plurality of strip-shaped electrodes to form the lens units.

5. The grayscale control structure according to claim 4, wherein the voltage applying device applies sequentially increased voltages to the plurality of strip-shaped electrodes corresponding to one of the lens units to ensure that light reaching the filter layer can pass through a corresponding light exit strip.

6. The grayscale control structure according to claim 4, wherein the voltage applying device applies sequentially decreased voltages to the plurality of strip-shaped electrodes corresponding to one of the lens units to ensure that light reaching the filter layer can be shielded by the black matrix.

7. A display device, comprising a grayscale control structure according to claim 1.

8. The display device according to claim 7, wherein each of the light extraction gratings has a width of 3~9 μm, and a horizontal distance between each of the light extraction gratings and the black matrix is 0.4~1.9 μm.

9. The display device according to claim 7, wherein each of the light exit strips comprises a quantum dot capable of adjusting a color of exit light.

10. The display device according to claim 7, wherein the grayscale control structure further comprises a voltage applying device for applying voltages to the plurality of strip-shaped electrodes to form the lens units.

11. A grayscale control method, applied in a grayscale control structure, wherein the grayscale control structure, comprising a first substrate, a light extraction layer, an electrode layer, a liquid crystal layer, a filter layer and a second substrate which are sequentially stacked; wherein the electrode layer is provided with a plurality of strip-shaped electrodes arranged in parallel to form lens units in the liquid crystal layer, the filter layer comprises light exit strips and a black matrix arranged side-by-side, and the light exit strips are disposed opposite to the lens units, the light extraction layer is disposed between the first substrate and the electrode layer, light extraction gratings are disposed in the light extraction layer for enabling light incident to the light extraction gratings to go to the liquid crystal layer, each of the light extraction gratings has a light exit angle of 0 to 3 degrees or 9 to 19 degrees, the light extraction gratings are disposed opposite to the light exit strips, and a projection of individual one of the light exit strips on the light extraction layer fully covers a corresponding one of the light extraction gratings, there is no overlap between orthographic projections of the light extraction gratings on the first substrate and an orthographic projection of the black matrix on the first substrate, wherein the grayscale control structure further comprises a flat layer disposed above the light extraction layer;
    wherein the method comprises:
    according to a display requirement, adjusting voltage applied onto each of the plurality of strip-shaped electrodes to change the shape of each of the lens units, so that light refracted by each of the lens units passes through the light exit strips or is shielded by the black matrix.

12. The grayscale control method according to claim 11, wherein voltages applied onto the plurality of strip-shaped electrodes corresponding to one of the lens units are increased sequentially to ensure that light reaching the filter layer can passes through a corresponding light exit strip.

13. The grayscale control method according to claim 11, wherein voltages applied onto the plurality of strip-shaped electrodes corresponding to one of the lens units are decreased sequentially to ensure that light reaching the filter layer can be shielded by the black matrix.

* * * * *